(No Model.)
J. M. SHUCK.
DEVICE FOR INVERTING BEE HIVES.
No. 335,153. Patented Feb. 2, 1886.
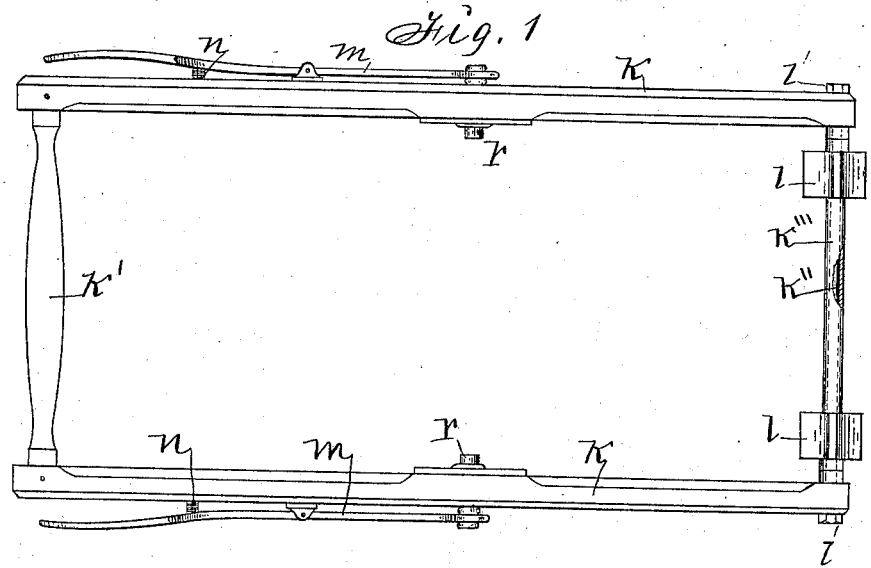
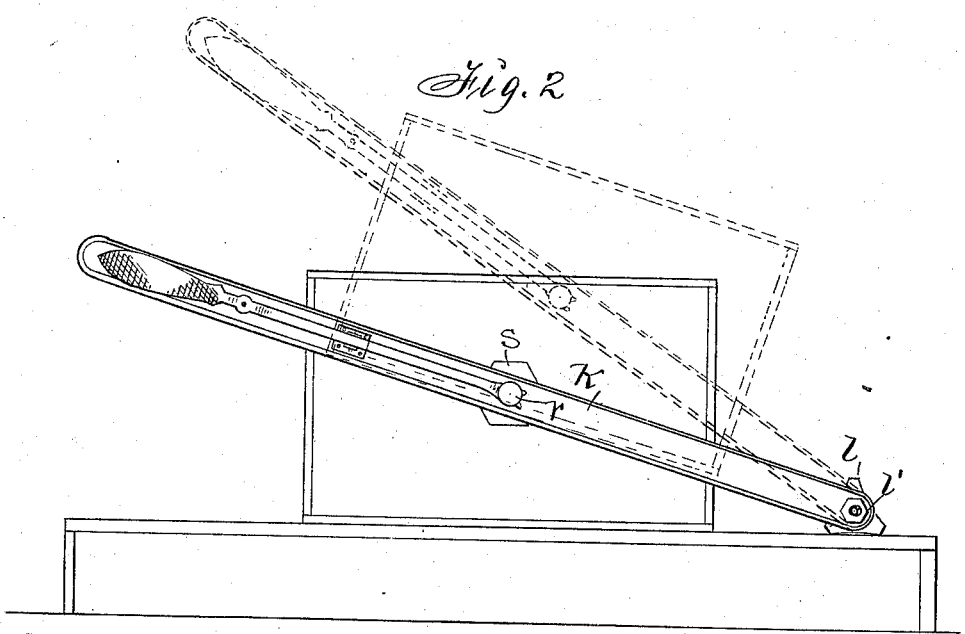
Witnesses:  Inventor:
   John M. Shuck
   By Thomas C. Orwig, Atty

UNITED STATES PATENT OFFICE.

JOHN M. SHUCK, OF DES MOINES, IOWA.

DEVICE FOR INVERTING BEE-HIVES.

SPECIFICATION forming part of Letters Patent No. 335,153, dated February 2, 1886.

Application filed June 24, 1885. Serial No. 169,678. (No model.)

*To all whom it may concern:*

Be it known that I, JOHN M. SHUCK, a citizen of the United States of America, and a resident of Des Moines, in the county of Polk and State of Iowa, have invented a Device for Inverting Bee-Hives, of which the following is a specification.

My object is to facilitate the inverting of bee-hives for the purposes specified in my application for Letters Patent of the United States filed February 19, 1885, and the patent, No. 329,341, issued upon said application October 27, 1885; and my invention consists in a portable frame having adjustable bearings upon which to suspend and revolve a hive, and adjustable shoes or fulcrums upon which to rest the frame and suspended hive, as hereinafter set forth, pointed out in my claims, and illustrated in the accompanying drawings, in which—

Figure 1 shows my complete device lying down flat and the adjustable bearings and fulcrums in their normal positions. Fig. 2 shows it applied to a hive as required for practical use.

$k$ $k$ are side bars, and $k'$ and $k''$ cross-pieces rigidly connected to produce an oblong frame. The cross-piece $k'$ is neatly rounded to adapt it to be used as a handle in operating the complete device. The cross-piece $k''$ is an iron rod that extends through perforations in the lower ends of the side bars, which are preferably made of wood. The ends of the rod are screw-threaded to receive nuts.

$k'''$ is a tube on the central portion of the rod.

$l$ $l$ are perforated triangular-shaped blocks or shoes, placed on the rod and against the ends of the tube in such a manner that they will serve as pivoted fulcrums when the frame is used as a lever of the second order in lifting and retaining suspended a bee-hive, to facilitate revolving and inverting the hive, as indicated by dotted lines in Fig. 2.

In place of using the tube $k'''$ to prevent the fulcrums $l$ from sliding inward on the rod, collars may be fastened to the rod, or shoulders formed thereon, and the tube dispensed with.

$l'$ represents nuts or washers placed on the rod $k''$ and between the side bars, $k$, and the fulcrums $l$, to aid in retaining the fulcrums in proper position on the rod or fixed cross-piece $k''$ of the frame.

$m$ $m$ are levers of the first order, pivoted against the outside faces of the side bars, $k$, of the frame. $n$ $n$ are springs fixed to the same bars in such a manner that they will, in their normal condition, press the long arms of the levers $m$ away from the bars $k$ and the ends of their short arms against the bars $k$, as required to project pins $r$, carried thereby, through perforations in the said side bars, $k$.

To operate the device thus constructed, I form in or fix to the opposite outside faces of a hive sockets adapted to admit the ends of the pins $r$, attached to the short arms of the levers $m$. I then place the frame over the hive and allow the shoes $l$ to rest flat upon the ground or the base on which the hive is placed, and insert the pins $r$ in the sockets in the side faces of the hive. When the frame is thus applied and combined with a hive, I lift the free end of the frame by means of the handle or cross-piece $k'$, to elevate and suspend the hive upon the bearings or pins $r$ in such a manner that the hive can be readily revolved and then replaced upon its base in an inverted position by simply lowering the elevated end of the frame.

To detach the lifting device from the hive, I simply press inward upon the long arms of the levers $m$, to thereby withdraw the pins $r$ from the sockets or pin-holes provided to receive them.

I claim as my invention—

1. A device for lifting and inverting bee-hives, composed of an oblong frame having pins projecting inward from the central portions of the side bars of the frame, means for moving the pins longitudinally, and shoes or fulcrums at the lower end of the frame, for the purposes stated.

2. In a device for lifting and inverting bee-hives, the combination of two parallel side bars, $k$ $k$, having end pieces, $k'$ $k''$, the latter of which is an iron rod, blocks or shoes $l$ $l$, loosely mounted thereon, two levers, $m$ $m$, pivoted to the faces of the side bars, and having pins $r$ $r$ upon their short arms projecting through holes in the side bars, and springs $n$ $n$, fixed to the side bars and pressing against the long arms of the levers, substantially as described.

3. In a device for lifting and inverting beehives, the combination of the side bars, $k$ $k$, the cross-piece $k'$, iron rod $k''$, tube $k'''$, and blocks or shoes $l$ $l$, mounted thereon and held in position by nuts $l'$, the levers $m$ $m$, pivoted to the side bars, having pins $r$ upon their short arms, and the springs $n$, fixed to the side bars and pressing against the long arms to force the pins through holes in the side bars, substantially as described.

JOHN M. SHUCK.

Witnesses:
R. H. ORWIG,
THOMAS G. ORWIG.